J. N. & T. Wallis.
Harrow.

N° 73061. Patented Jan. 7, 1868.

Witnesses
Avery Babbitt
H. M. Babbitt

Inventors
John N. Wallis
Theodore Wallis

United States Patent Office.

JOHN N. WALLIS AND THEODORE WALLIS, OF FLEMING, NEW YORK.

Letters Patent No. 73,061, dated January 7, 1868.

IMPROVEMENT IN HARROWS.

The Schedule referred to in these Letters Patent and making part of the same.

TO WHOM IT MAY CONCERN:

Be it known that we, JOHN N. WALLIS and THEODORE WALLIS, of the town of Fleming, in Cayuga county, New York, have invented a new and improved Mode of Constructing Harrows or Drags; and we do hereby declare the following to be a full, clear, and exact description of the same, reference being had to the accompanying drawings, making a part of this specification, and to the letters of reference marked thereon.

The object of this invention is to provide the means, or arrange certain devices, whereby the teeth in harrows or drags may be allowed to have a rotating motion around the longitudinal axis, at the time, or while being in use for seeding land, for the purpose of clearing said teeth from any grass or weeds which may adhere thereto.

And in order that others may know how to make and use our invention, we will proceed to describe its construction and mode of operation.

Figure 2:
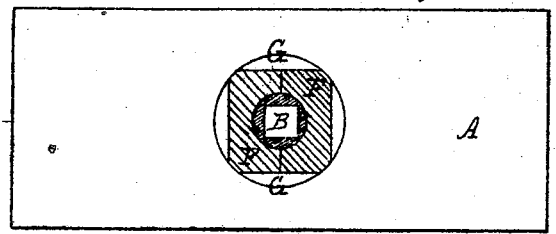
Figure 1:
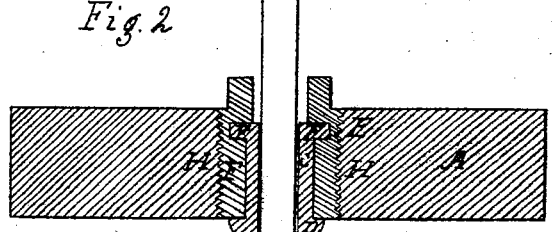

Figure 1 is a longitudinal section of a portion of one of the sides of a drag, and
Figure 2 is a plan of the same.

A shows a portion of the wood-work or side piece; B is the tooth; C, the cylinder, through which the tooth B is inserted. Said cylinder has two flanges, one at each end thereof. The flange D is below the nut F. The flange E is fitted into the nut F, as shown at E. Flange F is in two parts, as shown by the lines at G G, and has a screw-thread, H H, around the extreme diameter, and when screwed into the framework of the drag A, said framework holds the two portions of the nut together, as well as all the parts firmly in their place, while the cylinder C is allowed to turn freely, carrying with it the tooth B.

Having above described the construction and mode of operating our invention, what we claim as new, and wish to secure by Letters Patent, is—

1. The flanged cylinder C, when used as and for the purpose specified.
2. The double nut or shell-piece F, when used in the manner and made to subserve the purpose above set forth.
3. Supporting the teeth of drags or harrows by means of a cylinder, which shall allow the teeth to rotate as and for the purpose specified.

JOHN N. WALLIS,
THEODORE WALLIS.

Witnesses:
A. BABBETT,
H. M. BABBETT.